United States Patent

[11] 3,537,372

| [72] | Inventor | Siegfried Kaswan |
| | | Los Angeles, California |
| [21] | Appl. No. | 668,852 |
| [22] | Filed | Sept. 19, 1967 |
| [45] | Patented | Nov. 3, 1970 |
| [73] | Assignee | Hycon Mfg. Company |
| | | Monrovia, California |

[54] PANORAMIC CAMERA
4 Claims, 8 Drawing Figs.

[52] U.S. Cl.................................................. 95/16, 95/57
[51] Int. Cl.................................................. G03b 37/00, G03b 37/04
[50] Field of Search............................................95/16, 12.5, 38, 51, 45, 31, 57; 352/224, 228

[56] References Cited
UNITED STATES PATENTS

| 2,739,515 | 3/1956 | Heidecke | 95/31 |
| 1,283,408 | 10/1918 | Haworth | 95/16 |
| 2,893,300 | 7/1959 | Fajardo | 95/16 |
| 2,923,220 | 2/1960 | Bouwers | 95/16 |
| 2,931,284 | 4/1960 | Vinten | 95/57 |
| 3,168,858 | 2/1965 | Campbell | 95/16 |
| 3,252,370 | 5/1966 | Luther | 95/31X |
| 3,269,290 | 8/1966 | Lysle | 95/12.5 |
| 3,311,038 | 3/1967 | Cummins | 95/16 |

*Primary Examiner*—Norton Ansher
*Assistant Examiner*—Robert P. Greiner
*Attorneys*—Golove & Kleinberg ABSTRACT: A panoramic camera system is provided with a lens assembly, an endless curtain shutter, a pair of curved "rails" to support the film at the focal "plane" in lieu of an otherwise solid platen. A single motion source drives a rotating lens barrel and an endless focal plane shutter curtain continuously and drives the film intermittently. During a first rotation of the lens barrel, the film and shutter curtain move in synchronism, but with the shutter "closed". During a second rotation of the lens barrel, an opening in the shutter curtain moves in synchronism with the lens but the film is held in place for an exposure. A forward motion compensation assembly is also driven by the single motion source.

Patented Nov. 3, 1970            3,537,372

Siegfried Kaswan,
INVENTOR.
BY

GOLOVE & KLEINBERG,
ATTORNEYS.

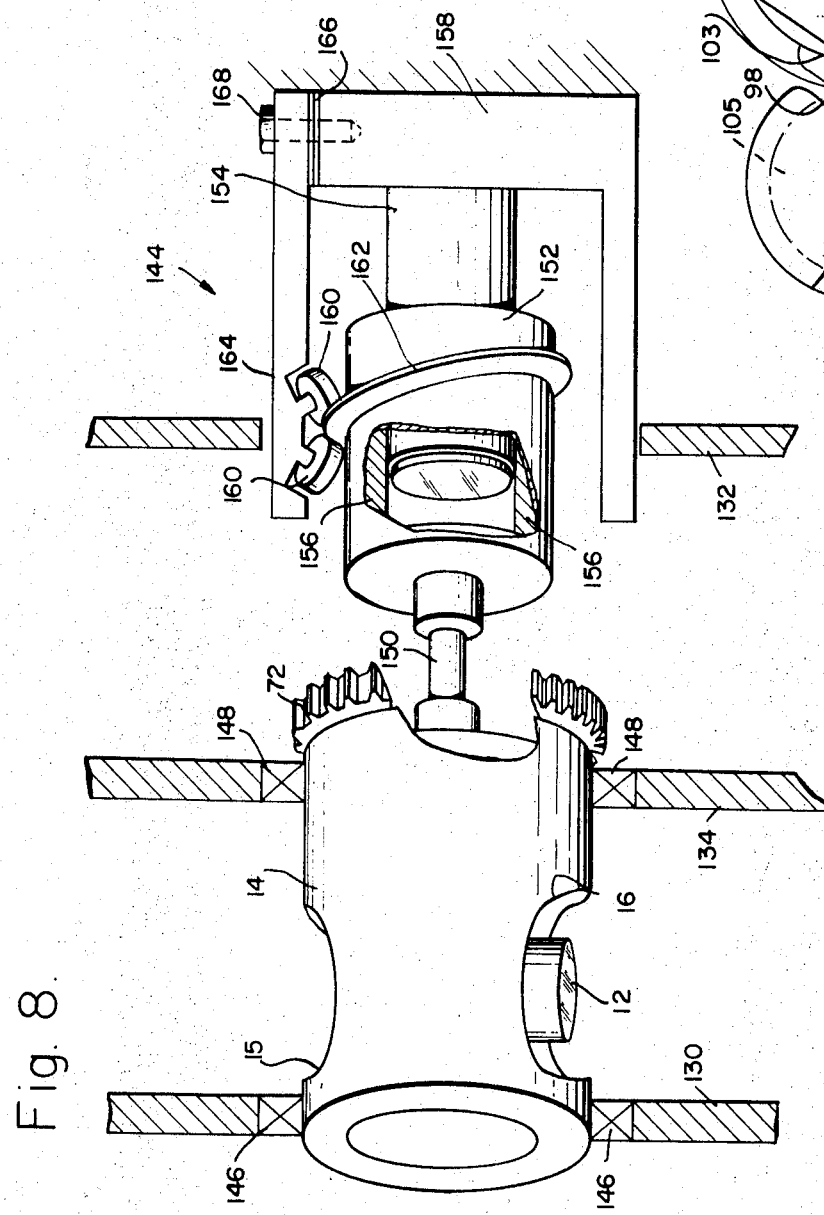

PANORAMIC CAMERA

This invention relates to improvements in panoramic cameras, and more particularly to an aerial panoramic camera system which is lightweight, compact and reliable.

In aerial photography, a camera which is capable of taking high resolution photographs in rapid succession, is carried by an aircraft. The speed of camera operation is normally adjusted so that consecutive photographs show portions of the terrain which overlap in the direction of aircraft flight. Since it is desireable that each such photograph include a large portion of the terrain in the direction lateral to aircraft flight, wide angle aerial cameras are generally employed.

One type of aerial camera for photographing a wide target field includes a rotatable lens system which rotates during the film exposure interval about an axis parallel to the "height" direction of the film format. The surface containing the focus of the image points described by the rotating lens, in such a case, is a section or a right circular cylinder, and indicates the camera "focal surface". A strip of film must therefore be positioned in the camera such that the film's photosensitive surface conforms to the camera focal surface. As the terrain image is scanned across the strip of film, the film is exposed to produce a complete photograph which is panoramic in width. Accordingly, such a camera is known in the art as a "-panoramic" camera.

When a panoramic camera is utilized in aerial photography, the camera is generally positioned in the aircraft such that the lens system axis of rotation is parallel to the aircraft longitudinal axis. The lens system rotational axis is therefore substantially parallel to the forward direction of aircraft velocity, so that the strip of terrain scanned by the rotating lens is laterally oriented with respect to the aircraft. The semicircular surface described by the film format is similarly laterally oriented, and receives the image of the terrain strip projected by the rotating lens system during the exposure interval.

In one type of conventional panoramic camera, the lens system is enclosed in a housing having a narrow slit which is positioned adjacent to the film format during exposure intervals, and which rotates with the lens system. After a complete film exposure, a capping curtain is commonly positioned between the film format and the lens system, and the lens housing is rotated to a starting position while a new film segment, or frame, is advanced into the cameral focal surface prior to the start of a new exposure interval. The capping curtain is thereupon removed, and the lens housing rotates to project the image of a succeeding terrain strip onto the film format, exposing the new frame.

Panoramic camera systems in the aerial photography prior art are generally comprised of complex subsystems. For example, in any panoramic camera, apparatus must be provided for supporting the film frame in the camera focal surface during the exposure intervals. In addition, for aerial photography and other applications requiring high frame rates, such apparatus must be permissive of rapid film transport between exposure intervals. In the past, these functions were fulfilled by the provision of a curved rigid surface, or a platen, positioned in the camera to coincide with its focal surface. The unsensitized surface of the film is pressed against the platen, so that the film conforms to the platen surface, although the holding pressure is usually not great enough to hinder film transport between exposure intervals. The film is pressed to the platen surface by the generation of a vacuum at apertures or grooves in the platen surface, which pulls the film to conform thereto. Between exposure intervals, the film is dragged across the surface of the platen to supply unexposed film at the focal surface.

Various disadvantages are inherent to the vacuum platen. For example, the dragging of the film over the surface of the platen causes film scratching which produces objectionable imperfections in the photographs. Furthermore, as the film is dragged over the platen, some of the antihalation material is removed from the back surface of the film and is deposited on the platen surface; this antihalation deposition tends to build up in the vacuum apertures and grooves, causing them to become clogged and therefore requiring frequent maintenance. The requirement of a continuous platen, along with the associated vacuum apparatus, adds appreciably to camera weight and complexity. In addition, it is quite expensive to fabricate a platen having a smooth, film bearing, wear resisting surface, and such expense is compounded by the providing of vacuum apertures and grooves in the platen.

Other systems utilize a pair of rollers positioned on opposite sides of the housing slit and synchronized to travel with the slit, for maintaining the film at the appropriate focal distance during exposure. After a complete exposure scan, the rollers must reverse their travel direction and be replaced in a starting position on the first side of the format. These conditions produce problems concerning synchronization, shock, and dynamic imbalance affecting stability.

In addition, the usual providing of a large number of moving parts further contributes to the complexity of prior art panoramic cameras. For example, individual drive means are often provided for film transport mechanisms, lens housing rotation mechanisms, and capping curtain transport mechanisms. In such cases, additional apparatus must be incorporated into the system to provide synchronization of the various moving parts. Alternatively, complex gearing systems are utilized in order to interconnect two or more mechanical systems.

Furthermore, it is generally necessary to provide an aerial camera with apparatus for image motion compensation in the direction of aircraft velocity (or forward motion compensation) during exposure intervals, in order to prevent blurring of the photograph due to motion of the image over the camera focal surface caused by the relative movement between the camera and the earth's surface. In prior art aerial cameras, forward motion compensation apparatus is provided with separate driving means which is synchronized to the camera system for operation during exposure intervals.

The panoramic camera system according to the present invention is characterized by a simplicity of design, and incorporates a novel type of film support means which eliminates the conventional platen with its associated vacuum apparatus. The present panoramic camera is further characterized by a drive train which is driven by a single motor, for driving a rotatable lens assembly and a shutter curtain in synchronism during exposure intervals, in addition to transporting the film between exposure intervals. The invention further includes forward motion compensation apparatus which can be coupled to the camera and which is operated by the drive train, without the necessity of providing a separate driving means.

Instead of utilizing a vacuum platen or oscillating rollers, as in prior art aerial cameras, the panoramic camera of the present invention provides a pair of film guide rails each exhibiting a curvature congruent with the profile of the cylindrical section describing the camera focal surface. These rails are positioned in the camera such that their convex surfaces are superimposed on the focal surface, external to the photographic format area and parallel to the direction of film transport. The photographic film is positioned such that its photosensitive surface conforms to the camera focal surface, by the film's being supported near its edges upon the convex surfaces of the parallel rails.

Tensioning means are provided for applying tension to the film segment in the direction parallel to the rails, so that the surface of the film (near the edges) is pressed against the convex surfaces of the rails. When the film segment is supported in this configuration, it has a natural tendency to exhibit substantial stiffness in the direction parallel to the surface axis of generation. In addition, the tension within the film, combined with the curvature, further assures stability of the film within the photographic format.

When used in the present panoramic camera, the convex surfaces of the two rails each describe a semicircular arc, so that the film format describes a section of a right circular cylinder having an axis coincident with the camera lens assembly axis of rotation.

It can be appreciated that the film guide rails provided in the present panormic camera avoid the necessity of providing a backing platen for the film format. Since the film is dragged only near its edges along a bearing surface between exposure intervals, scratching of the photographic format is avoided. Furthermore, the nonutilization of the backing platen, together with associated vacuum apparatus, provide substantial economies in camera weight, overall dimensions, cost, and maintenance, as well as permitting higher cycling rates. Although a platen has been eliminated, the rails of the present invention will be termed "platen rails" to descriptively indicate their function.

The camera of the present invention includes a lens assembly situated in a rotatable barrel type housing, having apertures for permitting the lens assembly to project the terrain image upon the camera focal surface. A separate curtain is provided adjacent to the film format, between the lens assembly and the concave sides of the platen rails, and contains a shutter slit which moves in synchronism with rotation of the lens assembly.

The shutter curtain is a continuous strip of light-impervious material, which travels around the convex surface of a format mask positioned adjacent to the concave surface of the platen rails. The curtain contains sprocket holes near its edges for engagement with a pair of synchronously driven sprockets, which drive the shutter curtain and which are situated on either side of the film format. Since these shutter drive sprockets are dually driven, friction is reduced between the curtain and the mask, and adjustment for slack is permitted across the curved portion of curtain travel. The convex surface of the mask is coated with a friction resistant material, for further reducing friction between the curtain and the mask. The curtain describes an endless loop which contains therein the film supply and pickup spools, similar in this respect to the shutter curtain described in a copending U.S. Pat. application, assigned to the assignee of present application and filed concurrently herewith, by Kreuz, et al., Ser. No. 668,803.

It should be noted that the continuity of the shutter curtain provides a capping feature for the film format area after exposure of each frame. Further, the frame size and location of the frame on the focal surface are determined by the length of the film supplied to the platen rails between exposure intervals and the location of the cutout portion of the format mask. For example, when the cutout portion of the format mask is positioned toward one side of the focal surface, the camera can be utilized for oblique angle photography.

In the panoramic camera system of the present invention, all of the dynamic components are mechanically coupled to and synchronized with a single prime mover, or motor. The motor drives an endless belt, which in turn drives the lens assembly and the shutter slit in synchronism during exposure intervals. The endless belt further drives the lens assembly and the shutter slit toward the film format between exposure intervals, as well as driving the film takeup spool and metering roller between exposure intervals to provide film transport.

Forward motion compensation apparatus may be provided by attaching a rotatable cam tube to the lens assembly barrel by means of a flexible connector, and the cam tube rotates along with the lens assembly. A captive cam surface directs the tube to move axially on a stationary mounting, imparting an oscillating motion to the camera which is pivoted. The cam profile is designed to provide camera movement which compensates for aircraft forward motion as well as panoramic "S" curve distortion (i.e. terrain displacement in the image along the width of the film format produced by the finiteness of the shutter slit seen across the format).

It is an object of the present invention to provide a panoramic camera system which is compact, lightweight and extremely reliable.

It is a further object of the present invention to provide a panoramic camera system in which all of the system's dynamic components are coupled to and synchronized with a single prime mover.

It is another object of the present invention to provide a panoramic camera system having a minimum number of dynamic components.

It is a still further object of the present invention to provide a shutter curtain system in a panoramic camera which caps the film format area after exposure, which is self-lubricating, and which includes a dual drive for controlling the shutter curtain tension in the format area for reducing drag thereof.

It is yet another object of the present invention to provide apparatus for supporting photographic film in a camera, near the film edges only, without the necessity of providing a backing platen within the area of the photographic format, and without the necessity of providing vacuum apparatus for supporting the film in an exposure position.

It is another object of the present invention to provide apparatus for guiding and supporting photographic film in a curved position coincident with the focal surface of a camera, without physical contact between the photographic format and the support structure.

It is a still further object of the present invention to provide apparatus for guiding film into an exposure position in the camera and for supporting the film in such position, which apparatus is permissive of film transport without inducing scratching of the photographic format.

It is yet another object of the present invention to provide apparatus for guiding and supporting film in an exposure position, which apparatus is relatively lightweight and relatively inexpensive.

It is yet a further object of the present invention to provide a panoramic camera system which is adapted to utilize forward motion compensation apparatus, which apparatus is operable without the requirement of providing separate driving means therefor.

The novel features which are believed to be characteristic of the invention, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

FIG. 6 is a side view of the intermittent drive mechanism shown in FIG. 5;

FIG. 8 is a part perspective, part cutaway, part cross-sectional view of forward motion compensation apparatus for use with the panoramic camera of the present invention.

Figure 1:
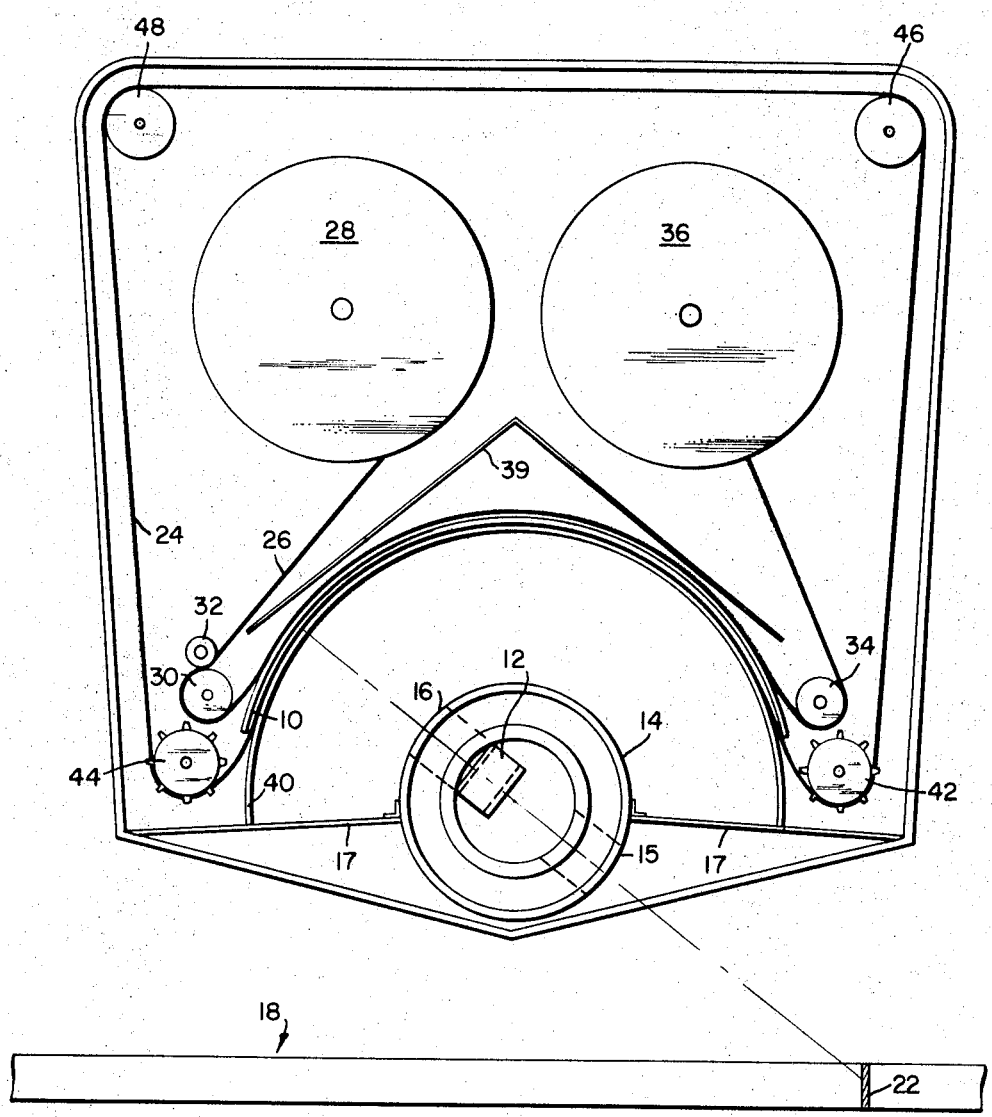
FIG. 1 is a plane view of a panoramic camera system according to the present invention.
Figure 2:
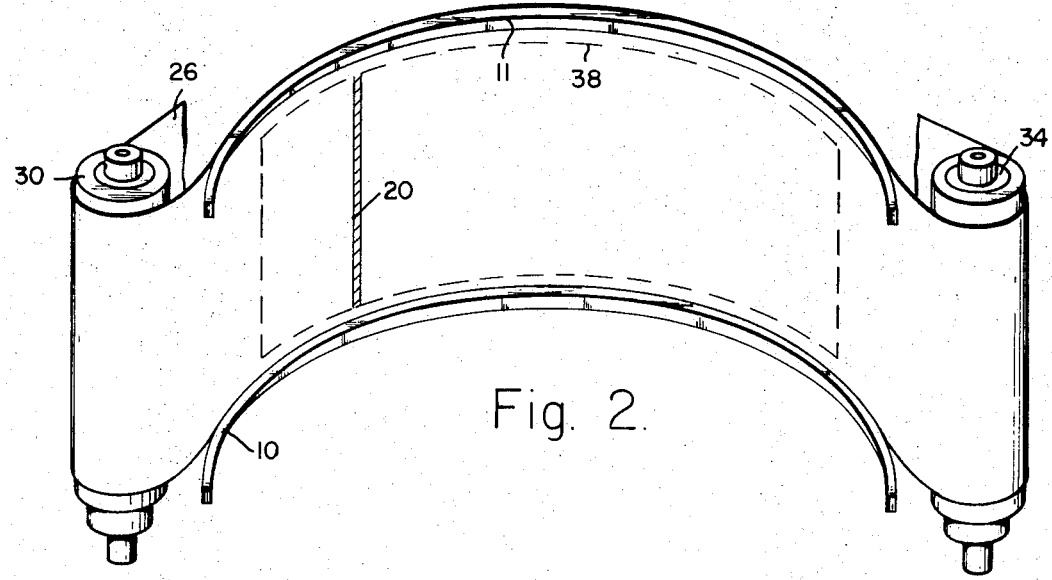
FIG. 2 is a perspective view of the platen rails included in the panoramic camera system of FIG. 1, illustrating their film guiding and support functions.

The structure and operation of the panoramic camera of the present invention may best be described by concurrent consideration of FIGS. 1 and 2. FIG. 1 is a plan view of the camera system, with the camera housing top panel removed. A pair of platen rails 10, 11 are positioned parallel to each other in the camera, and they are curved so that a surface generated by the linear connection of their convex sides is coincident with the camera focal surface. The lower platen rail 10 is shown in FIG. 1 (the upper platen rail 11 has been removed in this view of the camera system), while both rails 10, 11 are shown in FIG. 2.

The panoramic camera includes a lens assembly 12, which is housed in a rotatable barrel 14 having apertures 15, 16, and the camera focal surface is described by a focused image generated by the lens assembly 12 upon rotation of the barrel 14. A pair of front panels 17 are provided, which act as a light baffle.

A target 18 is shown in FIG. 1, which is a strip of terrain when the camera is being carried by an aircraft for aerial photography. The rotating lens assembly 12 scans the target strip 18 to project a scanned image of the target 18 at the camera focal surface, the complete image being comprised of incremental images 20 of incremental target areas 22. The width of the image increment 20 is established by a slit in a shutter curtain 24 positioned between the lens assembly 12 and platen rails 10, 11 and which traverses the camera focal surface during film exposure intervals in synchronism with the rotation of the lens assembly 12.

Unexposed photographic film 26 is adapted to be guided and supported near its edges, by the convex surfaces of the platen rails 10, 11 so that the photosensitive surface of the film 26 coincides with the camera focal surface, assuring accurate focal positioning regardless of film thickness. Since the camera focal surface is established by rotation of the lens assembly 12, the film 26 positioned between the platen rails 10, 11 must conform to a section of a right circular cylinder, so that the profile of the platen rails 10, 11 describes a semicircular arc.

Tensioning means are provided to press the film 26 against the convex sides of the platen rails 10, 11 to assure that the film 26 conforms to the desired profile. In the preferred embodiment of the panoramic camera, the tensioning means are combined with the film transport mechanism. For example, the film 26 is supplied from a supply spool 28, passes around a driven metering roller 30 and is further guided by a pinch roller 32, and is positioned in the camera focal surface by proceeding around an idling guide roller 34 and onto a takeup spool 36. The metering roller 30 pulls predetermined lengths of the film 26 from the supply spool 28 between exposure intervals, and the pinch roller 32 applies pressure to the film in contact with the metering roller to prevent film slippage. At the same time, the takeup spool 36 is also driven, pulling the supplied film over the focal surface and around the idling guide roller 34 while gathering the exposed film. The tensioning is provided by overdriving the takeup spool 36 with respect to the metering roller 30, since the circumference of the film 26 gathered on the takeup spool 36 is always greater than the circumference of the metering roller 30. This condition produces lateral tension in the film 26 between the takeup spool 36 and the metering roller 30, causing the edges of the film 26 positioned on the platen rails 10, 11 to be pressed against the rails. The tensioned film conforms to the profile of the convex surfaces of the platen rails 10, 11 so that the photosensitive surface of the film 26 coincides with the camera focal surface.

During an exposure interval, the panoramic image is scanned over a format area 38 on the photosensitive surface of the film 26. (A light baffle 39 is situated behind the format area 38 for preventing film "fogging"). The format area 38 is positioned between the two platen rails 10, 11 so that physical contact is never made with the film 26 between the photographic format and the platen rails. Between exposure intervals, the film 26 is dragged near its edges over the convex surfaces of the platen rails 10, 11, so that the area within photographic format 38 cannot become marred by scratches. In order to reduce friction between the film edges and the platen rails 10, 11, the convex surfaces of the platen rails can be made "self lubricating" by applying a friction resistant material, such as a Teflon impregnated tape, to the bearing surfaces of the platen rails.

The photographic format area 38 is circumscribed by the placement of a format mask 40 between the platen rails 10, 11 and the lens assembly 14. If desired, a smaller cutout portion of the format mask 40, may be positioned toward one end of the camera focal surface between the platen rails 10, 11. In such a case, the width of each frame will be decreased, so that the length of the film supplied to the platen rails by the metering roller is correspondingly decreased. In this configuration, the camera can be utilized for oblique angle photography, while increasing the number of frames available to a spool of photographic film.

A segment of the shutter curtain 24, which is an endless loop of a thin, flexible, light-impervious material, is positioned between the platen rails 10, 11 and the format mask 40. The shutter curtain 24 contains sprocket holes along its edges for engagement with driven sprockets 42, 44, located on opposite sides of the film format area 38. Since the sprockets 42, 44 are dually driven, the tension in the portion of the shutter curtain 24 positioned between these sprockets is adjustable. With only a slight amount of curtain tension, the shutter curtain 24 will conform to the convex surface of the format mask 40. Friction between the shutter curtain 24 and the format mask 40 is reduced by coating the bearing surface of the mask 40 with a friction resistant material, such as a Teflon impregnated tape, thereby causing the shutter curtain 24 to be "self lubricating". The shutter curtain loop is completed by the curtain's travelling about idle rollers 46, 48.

Figure 3:
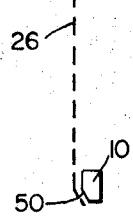
FIG. 3 illustrates cross-sectional views of two configurations of the platen rails of FIG. 2.

It should be pointed out that the tension applied to the film 26 need not be of considerable magnitude, since the inherent stiffness of the film 26 while conforming to a cylindrical section is in itself sufficient to provide stability to the film the photographic format area 38, within reasonable limits of film height and curvature radius. For films having a five inch height, however, it has been observed that if the platen rails 10, 11 have a rectangular cross section, the film 26 tends to buckle in the vicinity of the rollers 30, 34, is the radius of the platen rails exceeds approximately six inches. This condition can be avoided by providing platen rails 10, 11 having bearing surfaces which cause the film 26 to exhibit a reverse bend near its edges when tension is applied to the film, as shown in FIG. 3. The slanted surfaces 50, 51 of the platen rails 10, 11, respectively, prevent the film 26 from buckling for platen rails which have radii of curvature up to twelve inches (at least) when five inch film is utilized.

Figure 4:
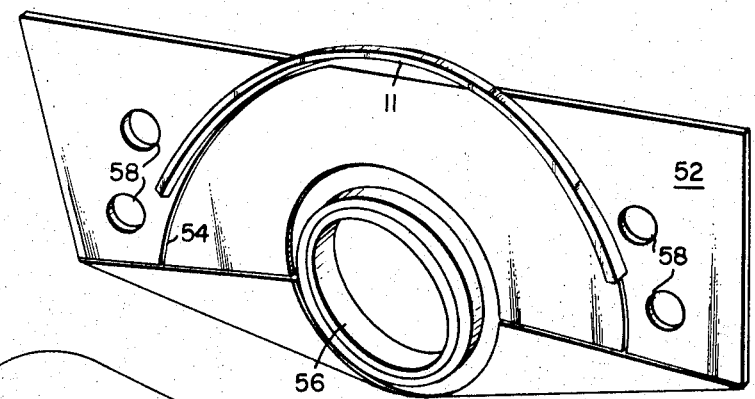
FIG. 4 is a perspective view of one of the platen rails of FIG. 2, and means for its support in a camera.

Turning now to FIG. 4, there is shown means for supporting certain of the components in the camera system. A plate 52 is adapted to fit over the optical portion of the camera system shown in FIG. 1. The top platen rail 11 is attached to the plate 52, and a slot 54 is provided in the plate 52 for positioning the top edge of the format mask 40. The plate 52 further contains a bearing 56 for rotatably supporting the lens assembly barrel; apertures 58 are provided for supporting the film rollers and the shutter sprockets.

Figure 5:
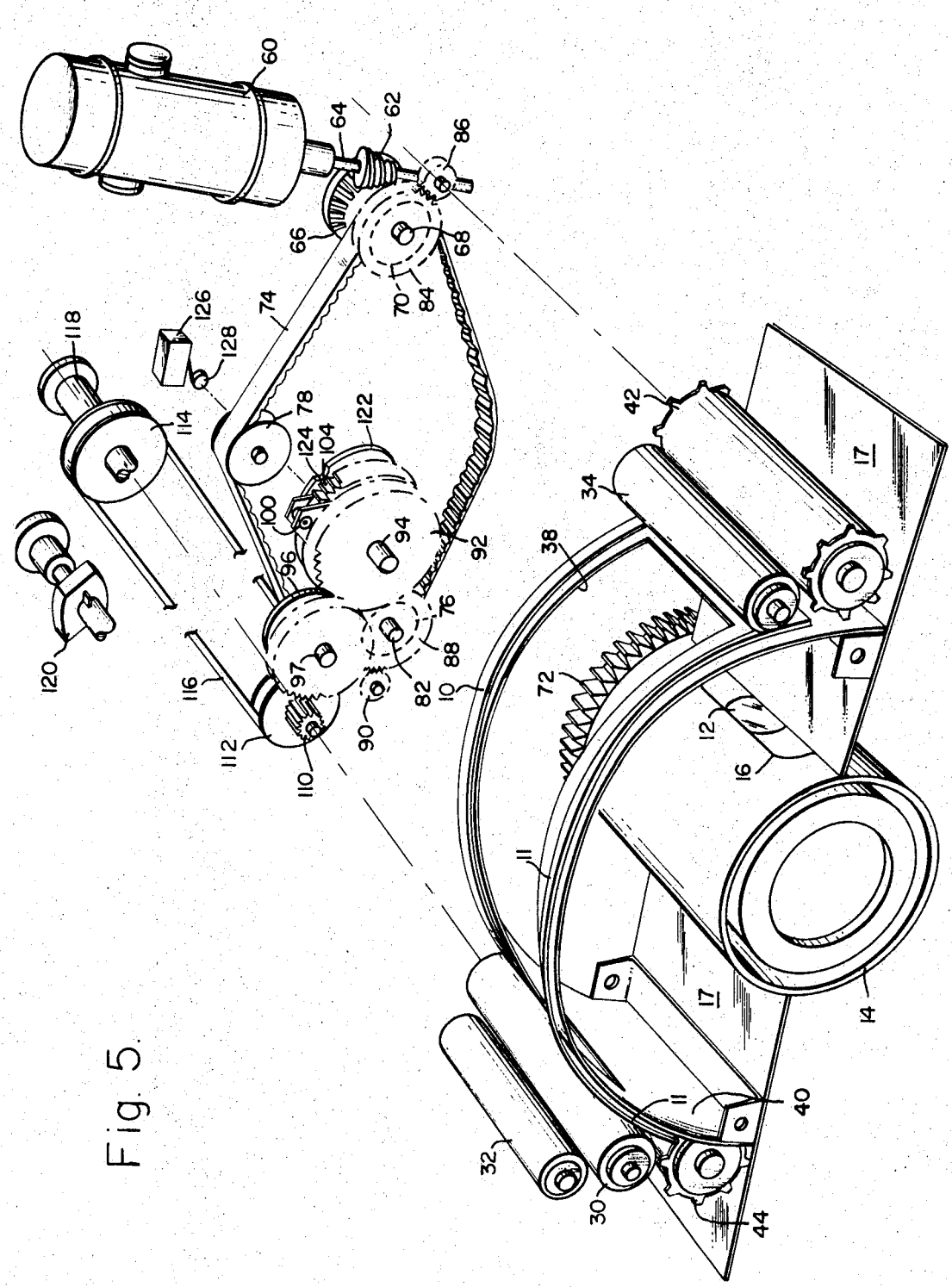
FIG. 5 is a perspective view of the panoramic camera drive mechanisms according to the present invention, together with the driver components.

Turning to FIG. 5, there is shown the interrelation of the mechanical components of the panoramic camera of the present invention, in which many reference numerals indicate similarly referenced components in FIGS. 1 through 4. For purposes of clarity, the drive mechanisms are shown broken away from the driven components, and dashed lines are shown to indicate mechanical interconnection of components. Furthermore, the film supply and takeup spools 28, 36, the film 26, and the shutter curtain 24 (shown in FIG. 1), are not shown in FIG. 5, although reference thereto will be made.

A single prime mover, such as dc motor 60, is provided for driving all of the moving parts in the camera system. A Spiroid pinion 62 is attached to a motor shaft 64, for transmitting shaft rotation (approximately reduced) to a Spiroid gear 66. The Spiroid gear 66 is concentrically mounted on a first shaft 68, upon which is also mounted a drive pulley 70 (shown in phantom), which rotates in accordance with rotation of the first shaft 68.

A lens drive gear 72 is rigidly coupled to one end of the lens assembly barrel 14, for rotating the lens assembly 12. A main drive belt 74 describes an endless loop around the drive pulley 70, the lens drive gear 72, a first idler pulley 76 (shown in phantom), and a second idler pulley 78. The main drive belt 74 is racked to assure positive engagement with the drive pulley 70, the lens drive gear 72, and the first idler pulley 76. The second idler pulley 78 can be regulated to adjust the tension in the belt. It is apparent that when the first shaft 68 is driven by the motor 60 (through the Spiroid gears 62, 66), the drive pulley 70 drives the main drive belt 74 which, in turn, drives the lens drive gear 72 to produce rotation of the lens barrel 14. The drive belt 74 further drives the first idler pulley 76, to produce rotation of a second shaft 82 upon which the first idler pulley 76 is rigidly mounted. It is the resulting rotations of the first shaft 68, the lens drive gear 72 and the second shaft 82 which consequently drive the other moving components in the camera system.

A first shutter sprocket drive gear 84 is rigidly mounted on the first shaft 68 and meshes with a first shutter sprocket pinion gear 86 which is concentrically attached to one end of the first shutter sprocket 42. Rotation of the first shaft 68, therefore, causes the first shutter sprocket 42 to be driven.

Similarly, a second shutter sprocket drive gear 88 is rigidly mounted on the second shaft 82, and meshes with a second shutter sprocket pinion gear 90 which is concentrically attached to one end of the second shutter sprocket 44. The first idler pulley 76 has the same diameter as the drive pulley 70, the second shutter sprocket drive gear 88 is identical to the first shutter sprocket drive gear 84, and the second shutter sprocket pinion gear 90 is identical to the first shutter sprocket pinion gear 86, so that the first and second shutter sprockets 42, 44 are driven at the same angular velocity. The shutter curtain (not shown) is therefore dually driven over the convex surface of the format mask 40, making it possible to adjust the "slack" in the portion of the shutter curtain which is positioned between the shutter sprocket 42, 44. The tension in this portion of the shutter curtain can therefore be adjusted until the curtain conforms to the convex surface of the format mask 40 without producing undue friction between the curtain and the format mask.

The driven second shaft 82, further, activates an intermittent drive mechanism for transporting the film between exposure intervals. For example, an intermittent drive pinion gear (not shown) can be rigidly mounted on the second shaft 82 to mesh with an intermittent drive gear 92. The intermittent drive gear 92 is rigidly mounted on a third shaft 94, and when driven by the intermittent drive pinion gear, causes the third shaft 94 to make one revolution for each complete cycle of camera operation.

In one type of intermittent drive, shown in detail in FIG. 6, a first intermittent drive wheel 95 is mounted on the third shaft 94 and a second intermittent drive wheel 96 is mounted on a fourth shaft 97. The second intermittent drive wheel 96 has a pair of cam surfaces 98, 99, for engagement with a pair of bars 100, 101, respectively, which are supported on the first intermittent drive wheel in a position parallel to the third shaft 94. The first intermittent drive wheel 95 contains thereon a raised first surface 102 which is in contact with a second surface 103 of the second intermittent drive wheel 96, for restraining rotation of the second intermittent drive wheel. When the third shaft 94 is driven, the first bar 100 rotates about the third shaft, and when in a first predetermined position, engages the first cam surface 98. At this position, the second surface 103 no longer restrains rotation of the second intermittent drive wheel 96, and the second wheel is caused to rotate until gear teeth 104 on the first intermittent drive wheel 95 mesh with gear teeth 105 on the second intermittent wheel 96. The second intermittent drive 15 wheel 96 continues to rotate until the second bar 101 engages the second cam surface 99 at a second predetermined position, whereupon the first surface 102 engages the second surface 103 to restrain further rotation of the second intermittent drive wheel.

When the fourth shaft 97 is driven by the second intermittent drive wheel 96, an intermittently driven gear 108, which is rigidly mounted on the fourth shaft, drives an intermittently driven pinion gear 110 which is attached to one end of the film metering roller 30. The intermittently driven pinion gear 110 is also attached to a film transport pulley 112 which drives a film takeup spool pulley 114 through a takeup spool drive belt 116. The takeup spool pulley 114 is coupled to the takeup spool (not shown) through adjustable takeup spool drag means 118, which permit the film to be tensioned between the takeup spool and the metering roller 30. Adjustable supply spool drag means 120 are also provided, and are coupled to the film supply spool (not shown) to permit rotation thereof without causing inertial unwinding of the film. Accordingly, when the intermittently driven pinion gear 110 is driven, both the film metering roller 30 and the film takeup spool are driven to supply unexposed film over the platen rails 10, 11 prior to exposure of a new frame, and the exposed film is gathered by the takeup spool. Since the film on the takeup spool always has a larger diameter than the diameter of the metering roller 30, the film is overdriven by the takeup spool with respect to the metering roller, and the film which is positioned on the platen rails 10, 11 is in a tensioned condition.

Means can be provided for stopping the motor 60 after the completion of each cycle of camera operation. For example, a disc cam 122 may be rigidly mounted on the third shaft 94, and contains a notch 124 in the cam surface. A switch 126 is activated by a cam follower 128 which is depressed into the notch 124 once each rotation of the third shaft 94. The switch 126 may be connected to an intervalometer (not shown) for controlling the duration of the interval between the end of one complete cycle and the beginning of the following cycle of camera operation.

In one example of the panoramic camera of the present invention, the film format area, as circumscribed by the mask 40, is 2.25 inches in height and 7.50 inches in width, and is exposed through a 135° rotation of the lens assembly 12. Each complete cycle of camera operation can involve two complete revolutions of the lens assembly barrel 14 and one complete loop revolution of the shutter curtain or alternatively, one lens barrel revolution and one-half shutter revolution if the shutter is provided with two slits, one-half loop revolution apart. During the 135° exposure interval, the lens assembly 12 and the shutter slit move in synchronism.

As one example of a complete camera operation cycle including the 135° format scan, the camera can operate as hereinafter described. Upon energization of the motor 60, the lens barrel 14 and the shutter accelerate to a constant velocity. This involves approximately 30° of lens rotation, and the shutter curtain reaches a velocity of approximately 45 inches per second. The takeup spool and the film metering roller 30 remain stationary, and an unexposed film frame is held stationary upon the the platen rails 10, 11. At this point during the cycle, the shutter curtain slit enters the optical path of the lens assembly 12, and both the shutter slit and the lens assembly scan the film format during the next 135° of lens barrel rotation to expose the format. In this example, the exposure interval is 1/1500 second, although other shutter speeds are possible to provide other exposure intervals. The film thereupon remains stationary for an additional 6° overtravel before the intermittent film drive mechanism drives the intermittently driven pinion gear 110. During the following 184°, the film is transported for positioning of the next frame and gathering of the exposed film onto the takeup spool. When film transport has ended and a new frame is positioned on the platen rails 10, 11, the cam 122 trips the switch 126 to stop the camera within the final 5° of lens barrel rotation.

In this example of the panoramic camera system operation, each cycle is completed in 0.5 second although other cycling rates are possible. Furthermore, an intervalometer can be utilized to provide various time intervals between cycles.

Figure 7:
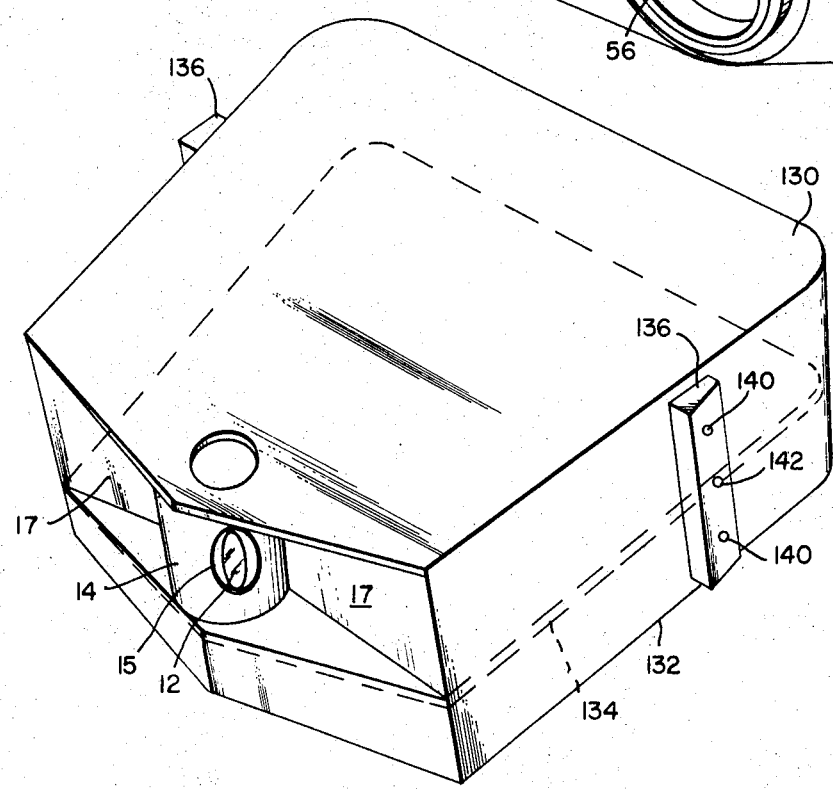
FIG. 7 is a perspective view of a housing for the panoramic camera system of the present invention.

Turning to FIG. 7, there is shown one configuration of a housing for the panoramic camera system of the present invention, in which many reference numerals indicate similarly referenced components in FIG. 1. Between a top panel 130 and a bottom panel 132, a divider panel 134 is positioned for separating a top portion of the housing containing the components shown in FIG. 1, from a bottom portion of the housing containing the drive mechanisms shown in FIG. 5. The divider panel 134 contains appropriate apertures and bearings for rotatably coupling the drive mechanisms in the second portion of the housing to the driven components in the first portion of the housing.

Mounting members 136 are provided on each of two opposite sides of the camera housing. A pair of apertures 140 can be provided in each of the mounting members 136 for securing the camera to an appropriate mounting station. A third, centralized aperture 142 is further provided in each of the mounting members 136, for pivotally mounting the camera when the forward motion compensation mechanism of the present invention is employed.

Turning to FIG. 8, there is shown forward motion compensation apparatus 144 for preventing blurring of photographs due to motion of the image over the focal surface caused by the relative movement between the camera and the earth's surface. The forward motion compensation apparatus according to the present invention is operated by the rotation of the lens barrel 14, and rocks the camera about a pivot axis when the camera is pivotally mounted at the pivot points 142 shown in FIG. 7.

The lens assembly barrel 14, which is rotatably supported in the camera by a first bearing 146 mounted in the top panel 130 and by a second bearing 148 mounted in the divider panel 134, is coupled to the forward motion compensation apparatus 144 by means of a flexible cable 150 which is positioned on the lens barrel rotational axis. The forward motion compensation apparatus 144 is partially inserted into the bottom portion of the camera housing through an aperture located in the housing bottom panel 132.

A closed end of a tube cam 152 is mounted to the flexible cable 150 along the cam cylindrical axis, and the inner surface of the tube cam 152 is reciprocally mounted on a cylindrical shaft 154 by means of a bushing 156. The shaft 154 is rigidly supported by a mounting member 158 which is mounted in a stationary position to the aircraft mounting station. Guide means, such as a pair of bearings 160 are positioned for guiding a raised cam surface 162 on the tube cam 152, and the bearings 160 are rotatably supported by a mounting arm 164 which is rigidly attached to the mounting member 158. The support arm 164 can be adjusted to eliminate end play between the cam surface 162 and the bearings 160, by means of shims 166 which can be inserted between the support arm 164 and the mounting member 158, and the support arm can be secured to the mounting member 158 by bolts 168, for example.

In operation, the rotational velocity of the lens assembly barrel 14 is transmitted to the tube cam 152 through the flexible cable 150. Since the cam bearings 160 are rotatably supported along fixed axes, their contact engagement with the rotating cam surface 162 causes the tube cam 152 to reciprocate over the stationary guide 154. This reciprocation of the tube cam 152 causes the flexible cable 150 to reciprocate, and the lens barrel 14 therefore pivots about a pivot axis connecting the camera mounting points. The cam surface 162 is designed so that the resulting velocity of the lens assembly barrel 14, during the camera exposure intervals, compensates for image motion at the camera focal surface caused by air craft velocity and altitude, as well as compensating for panoramic "S" curve distortion.

Thus, there has been shown a preferred embodiment of a panoramic camera system which is characterized by a simplicity of design utilizing a single prime mover for the operation of all of the camera functions, and which further eliminates the conventional platen with its associated vacuum apparatus. The simplicity of the panoramic camera of the present invention provides an aerial camera which is compact, lightweight and extremely reliable. For example, the complete camera (including heaters, controls and film) has a weight of approximately 10 pounds and a maximum external dimension of approximately 11 inches (5 inches minimum).

Other embodiments of the camera system of the present invention and modifications of the embodiment herein presented may be developed without departing from the essential characteristics thereof. For example, although the platen rails of the present invention find particular application in a panoramic camera, they may be utilized for guiding and supporting photographic film in a cylindrical section coincident with the focal plane of other types of cameras, such as a camera having a nonrotating wide angle lens. In such cameras, the photographic format may describe a cylindrical surface other than a section of a right circular cylinder, such as a section of a parabolic cylinder, for example.

I claim:

1. A panoramic camera system adapted to utilize continuous photographic film, comprising:
    a. a rotatable lens assembly describing a cylindrical focal surface when said lens assembly is rotated;
    b. platen rails, for guiding and supporting a portion of the film in an exposure position determined by a section of said focal surface;
    c. film supply means;
    d. film transport means for transporting unexposed film to said platen rails and for gathering exposed film;
    e. shutter means including an endless shutter curtain interposed between said platen rails and lens assembly, said shutter curtain having an exposure slit for exposing said film portion only at predetermined times during rotation of said lens assembly, one rotation of said shutter curtain requiring more than one rotation of said lens assembly for preventing exposure at all other times during rotation of said lens assembly; and
    f. drive means coupled to said film transport means, said lens assembly, and said shutter means, for intermittently driving said film transport means, but for continuously rotating said lens assembly, and transporting said curtain.

2. The panoramic camera system according to claim 1, above, wherein said drive means utilizes a single prime mover.

3. The panoramic camera system according to claim 1, above, wherein said camera system is adapted to be pivotally mounted to an aircraft, and further including forward motion compensation means adapted to be driven by a rotatable lens assembly barrel for reciprocating said camera and said lens assembly to compensate for image motion in the direction of aircraft flight.

4. A camera system having a photographic format along a cylindrical focal surface and a pair of platen rails each having a convex side conforming to the directrix of said cylindrical surface, adapted to be positioned substantially parallel to one another along said surface and on opposing sides of said photographic format, the combination comprising:
    a. a metering roller positioned in the film path preceding said photographic format, for supplying predetermined lengths of film to said platen rails;
    b. an idler roller positioned in the film path proceeding said photographic format;
    c. a film takeup spool, for transporting the film supplied by said metering roller over said idler roller and for gathering unexposed film; and
    d. drive means for intermittently driving said metering roller and said takeup spool in synchronism whereby the film is overdriven by said takeup spool with respect to said metering roller.